United States Patent [19]
Shah et al.

[11] Patent Number: 5,456,767
[45] Date of Patent: * Oct. 10, 1995

[54] CORROSION INHIBITION WITH BILAYER-FORMING SURFACTANTS

[75] Inventors: Sayed S. Shah; Thomas G. Braga; Bernardus A. Oude Alink; Jacob Mathew, all of St. Louis, Mo.

[73] Assignee: Petrolite Corporation, St. Louis, Mo.

[*] Notice: The portion of the term of this patent subsequent to Aug. 9, 2011 has been disclaimed.

[21] Appl. No.: 137,657

[22] Filed: Oct. 15, 1993

[51] Int. Cl.$^6$ .............................. C23C 22/00; C23F 11/00
[52] U.S. Cl. ................... 148/251; 106/14.05; 106/14.15; 106/14.16; 106/14.41; 106/14.42; 106/14.43; 148/245; 148/250; 148/255; 148/270; 148/271; 148/274; 148/283; 252/390; 422/7; 422/12; 422/16
[58] Field of Search ...................... 148/245, 250, 148/251, 255, 270, 271, 274, 283; 106/287.2, 287.21, 287.23, 287.24, 287.25, 287.27, 287.28, 287.29, 287.3, 287.32, 503, 506; 422/7, 12, 16; 252/390

[56] References Cited

U.S. PATENT DOCUMENTS

| | | | |
|---|---|---|---|
| 4,332,967 | 6/1982 | Thompson et al. | 564/162 |
| 4,393,026 | 7/1983 | Thompson et al. | 422/12 |
| 4,770,906 | 9/1988 | Harwell et al. | 427/212 |
| 4,900,627 | 2/1990 | Harwell et al. | 428/403 |
| 4,981,609 | 1/1991 | Thompson et al. | 422/12 |
| 5,013,483 | 5/1991 | Frenier et al. | 422/12 |
| 5,106,691 | 4/1992 | Harwell et al. | 428/411.1 |
| 5,336,441 | 8/1994 | Shah et al. | 252/390 |

*Primary Examiner*—David A. Simmons
*Assistant Examiner*—Robert R. Koehler
*Attorney, Agent, or Firm*—Kenneth Solomon

[57] ABSTRACT

A method for inhibiting corrosion of a metal surface in a liquid medium is described. The method comprises incorporating into the medium a corrosion inhibiting amount of a combination of a surfactant that forms a bilayer on the metal surface in the fluid and a corrosion inhibitor that solubilizes in the medium in the presence of the surfactant. The amount of surfactant is sufficient to produce a bilayer on the metal surface in the medium. The combination is a. an anionic surfactant that forms a bilayer on the metal surface and a cationic corrosion inhibitor;

b. a cationic surfactant that forms a bilayer on the metal surface and an anionic corrosion inhibitor;

c. an ionic surfactant that forms a bilayer on the metal surface and an ionic corrosion inhibitor having a pendent, generally straight chain hydrocarbon or substituted hydrocarbon moiety of from about 10 to about 18 carbon atoms; or d. an ionic surfactant that forms a bilayer on the metal surface and a non-ionic corrosion inhibitor.

Related compositions and methods are also disclosed.

31 Claims, 1 Drawing Sheet

CORROSION INHIBITION WITH BILAYER-FORMING SURFACTANTS

BACKGROUND OF THE INVENTION

1. Field of the Invention

The present invention relates to corrosion inhibition and more particularly to a new technique for inhibition of corrosion applicable to a wide variety of systems and metals.

2. Description of Prior Art

A solution has long been sought to the widespread and troublesome problem of corrosion. Corrosion has been an intractable problem with respect to various metal surfaces in a wide variety of systems. For example, corrosion of ferrous surfaces in oil refinery overhead streams, heat exchangers, towers and tower pump-around systems (in particular, of the crude distillation unit and vacuum distillation tower) and other distillation towers has not been solved to complete satisfaction. Likewise, corrosion of other metals and corrosion associated with other systems, whether such corrosion is oxygen corrosion, carbon dioxide corrosion, acid corrosion or otherwise, remains a serious problem.

An example of one particular situation in which oxygen or hydrogen sulfide corrosion is especially troublesome is refinery overheads. It has been difficult to solve the problem of corrosion in refinery overheads because such streams are highly acidic, typically having a pH of from less than 1 to about 3, and are maintained at temperatures exceeding about 200° F. (93° C.). By contrast, conventional corrosion inhibitors typically are employed in environments that are characterized by far less severe conditions. For example, corrosion inhibitors employed in oil field pipelines generally are not considered satisfactory corrosion inhibitors for refinery overhead streams and distillation towers, first because the disparate nature of the oil field pipeline and refinery/distillation technologies results in a failure to consider application of corrosion inhibitors from one art to the other art, but also because oil field pipeline fluids ordinarily are not strongly acidic (rarely, if ever, having a pH below about 4) and are at generally ambient temperatures. Thus, oil field corrosion inhibitors are not recognized as effective in highly acidic, high temperature conditions, which conditions themselves increase corrosion rates dramatically.

Accordingly, whereas the refinery and distillation streams include a strong acid, HCl, with which the corrosion therein is associated, and are maintained at a temperature of at least about 200° F. (93° C.), and often as high as 300° F. (149° C.) or more, oil field pipeline corrosion is associated with weak acids due to the presence of hydrogen sulfide and carbon dioxide and typical pipeline temperatures are under 100° F. (38° C.).

Because corrosion inhibitors have not been found to be satisfactory under the low pH, high temperature conditions of refinery overhead streams and distillation towers, it has been common practice to attempt to resolve at least the acidity problem by neutralizing the stream by addition of ammonia or certain organic amines, such as ethylene diamine, to raise the pH above 4 (generally to about 6) before addition of the corrosion inhibitor. This technique has been found to be unsatisfactory not only because of the extra treatment step and extra additive required, but also because the amines added to the stream tend to form corrosive HCl salts, which tend to exacerbate the problem and to corrode. Efforts to find suitable corrosion inhibitors for such applications typically have not produced entirely satisfactory results. Moreover, many inhibitors currently in use contain phosphorus, which affects catalysts downstream deleteriously.

Accordingly, while U.S. Pat. Nos. 4,332,967 and 4,393,026, both to Thompson et al., mention that the particular compounds disclosed therein might be applicable to refineries or distillation towers, corrosion inhibitors for oil field pipelines are not recognized to be applicable generally to refinery overhead streams, especially without first neutralizing the HCl in such streams. Thompson et al. also mentions (at co. 20, lines 29–33 of '967 and col. 20, lines 4–8 of '026) that the corrosion inhibitors described therein are effective in systems of "high temperature, high pressure and high acidity, particularly in deep wells, and most particular in deep gas wells." However, the acidity of such wells usually is not below about pH 3.5, generally not below pH 4, especially in wells that are not of high temperature and high carbon dioxide content. Thus, Thompson et al. do not suggest that the compositions described therein would be effective at lower pH's (as found in refinery overheads), or that their use in refineries would be in a manner other than the standard, conventional technique, which calls for addition of ammonia or an amine to increase the pH above 4 (with the problems connected therewith). And more generally, conventional corrosion inhibitors have been found to be either ineffective or susceptible to entering into undesirable side reactions in the highly acidic conditions of refinery overheads.

U.S. Pat. Nos. 4,770,906, 5,106,691 and 4,900,627 to Harwell and O'Rear mention in passing the possibility of the formation of a corrosion barrier, but disclose no more in that respect.

Thus, corrosion inhibitors that are effective in the low pH, high temperature conditions of refinery overhead streams without the need for neutralizing the HCl in such streams are needed.

Likewise, other corrosion inhibitors are system specific or not as effective as desired. Thus, corrosion inhibitors that can treat a wide variety of systems and that are even more effective at inhibiting corrosion are still being sought.

SUMMARY OF THE INVENTION

The present invention, therefore, is directed to a novel method for inhibiting corrosion of a metal surface in a liquid medium. The method comprises incorporating into the medium a corrosion inhibiting amount of a combination of a surfactant that forms a bilayer on the metal surface in the medium and a corrosion inhibitor that solubilizes in the medium in the presence of the surfactant, the combination being selected from the group consisting of:

a. an anionic surfactant that forms a bilayer on the metal surface and a cationic corrosion inhibitor;

b. a cationic surfactant that forms a bilayer on the metal surface and an anionic corrosion inhibitor;

c. an ionic surfactant that forms a bilayer on the metal surface and an ionic corrosion inhibitor having a pendent, generally straight chain hydrocarbon or substituted hydrocarbon moiety of from about 10 to about 18 carbon atoms; and d. an ionic surfactant that forms a bilayer on the metal surface and a non-ionic corrosion inhibitor.

The present invention is also directed to novel dithiothione inhibitors useful in such methods and to novel methods for preparation of such inhibitors.

The present invention is further directed to novel benzothiazine corrosion inhibitors useful in such methods.

Among the several advantages of the invention, therefore, may be noted the provision for a method for improved corrosion inhibition, the provision of such method that is highly effective against oxygen corrosion, carbon dioxide corrosion and/or hydrogen sulfide corrosion; the provision of such method that is effective at low pH; the provision of such method that avoids the use of phosphorus; the provision of certain corrosion inhibitors that are particularly suitable for such methods; and the provision of methods of synthesis of such compositions.

DETAILED DESCRIPTION OF THE INVENTION

Figure 1:
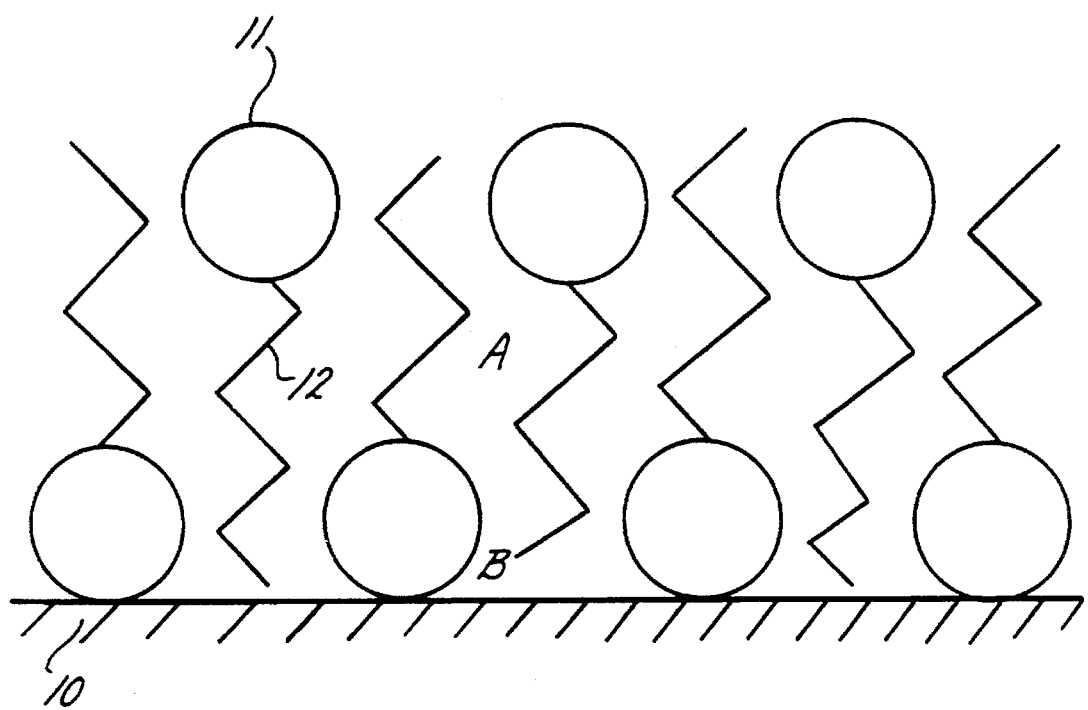
FIG. 1 is a schematic representation in elevation of a surfactant bilayer over a metal surface.

In accordance with the present invention, it has been discovered that certain surfactants that form bilayers on metal surfaces dramatically improve the corrosion inhibitive effectiveness of a wide variety of corrosion inhibitors and impart superior corrosion inhibitive qualities to many compositions that are not otherwise suitable corrosion inhibitors. However, such superior effectiveness requires coordination of the surfactant with the corrosion inhibitor. In particular, it has been discovered that the surfactant should be ionic and the inhibitor should be either non-ionic or, if ionic, either of charge opposite that of the surfactant or of a molecular structure having a "tail" of from about 10 to about 18 carbon atoms, in which case the surfactant may be either cationic or anionic.

Moreover, in the case of vinyl monomers, it has been found that such monomers polymerize in situ, initiated by the iron ions resulting from corrosion, to form a film over the metal surface. Similar action is expected to occur with respect to other metals. The film serves as a barrier, sealing off the surface and virtually halting corrosion. This is particularly significant for aerated systems (e.g., cooling water) in which oxygen corrosion has been a problem but may also be advantageous against other types of corrosion, such as that from hydrogen sulfide and/or carbon dioxide. In some situations, somewhat less effective, but still significantly improved corrosion resistance can be found with such vinyl monomers, but without polymerization.

By the techniques of this invention, extremely effective protection has been achieved. In fact, in the cases of polymerization of vinyl monomers, a steady state rate of about 0 mpy (mils per year) may achieved. In addition, such corrosion protection may be achieved against oxygen corrosion at very low pH, providing a superior method for inhibiting corrosion in the troublesome case of refinery overhead units without the need for neutralizers. Not only that, but many such inhibitors of which invention contain no phosphorus, thereby achieving exceptional corrosion protection without adding disfavored phosphorus to the system.

While the inventors do not wish to be bound by any particular theory, it is believed that a film of inhibitor is maintained over metal surfaces in the treated medium by the bilayer of surfactant formed over the surfaces, as dictated by the electrostatic and hydrophobic interactions among the surfaces, surfactant and inhibitor. The film, therefore, provides a corrosion resistant barrier resulting in corrosion inhibition superior to that achieved by use of the inhibitor without the surfactant. Thus, improvement of corrosion protection has been found for a wide range of inhibitors when employed in the surfactant/inhibitor combination selected according to the aforementioned criteria. Moreover, superior results have been found for a wide variety of types of corrosion, including oxygen corrosion, hydrogen sulfide corrosion, carbon dioxide corrosion, acid corrosion, etc.

Nevertheless, as noted above, certain types of inhibitors have been found to provide especially dramatic improvement in corrosion protection by polymerizing in situ according to a polymerization reaction initiated by corrosion. Thus, whereas the polymerization of the Harwell and O'Rear patents often require chemicals or other methods to initiate polymerization (see, for example, col. 2, lines 45–60 of U.S. Pat. No. 4,770,906) and only in some cases "may occur" spontaneously (see, for example, col. 5, lines 48–51 of U.S. Pat. No. 4,770,906), and the noted patents disclose cases in which an external initiator is required. However, in the present invention, oxygen corrosion inherently occurring in the systems to be treated initiates polymerization automatically and, perhaps even more surprising, halts the polymerization automatically at the proper point. In other words, the systems not only switches on the polymerization automatically when the corrosion reaction starts, but switches it off automatically as well when the corrosion reaction stops. By contrast, Harwell and O'Rear report that in their system, polymerization is initiated by an external initiator and is arrested preferably before an emulsion is formed (or polymerization in the bulk aqueous phase) (see, for example, col. 5, lines 61–63 of U.S. Pat. No. 4,770,906). Thus, the present invention avoids polymerization in the bulk aqueous phase, instead directing the polymerization reaction to the specific site of the bilayer.

Accordingly, in oxygen corrosion systems treated by the technique of this invention, the corrosion inhibitive film forms quickly, sealing off the metal surface before substantial corrosion occurs. Once the surface is sealed off, the corrosion virtually halts, stopping further polymerization. Thus, such surfactant/inhibitor combinations form a polymerized film over the metal surface which serves as an extremely effective barrier that is especially effective in inhibiting further oxygen corrosion. Such inhibitors are also effective in carbon dioxide or sour systems.

Thus, while Harwell and O'Rear, in their patents noted above, suggest the use of bilayer surfactants in forming polymeric films that may serve as corrosion barriers, they do no more in that respect. They do not explain how to create a barrier with such characteristics. Moreover, they fail to disclose the system coordination that has been found to be required; namely, that the charges of the surfactant and inhibitor be coordinated. Nor do Harwell and O'Rear disclose the improved corrosion inhibition that can be achieved without polymerization. Further, the Harwell and O'Rear patents do not teach or suggest the use of corrosion inhibitors per se, which operate by chemical interaction with other components of the system, such as the corrosive or the metal ions from the corroding surface. To the contrary, the Harwell and O'Rear patents appear to suggest that the corrosion barrier results from polymerization of a monomer that does not ordinarily have corrosion inhibitive properties to form an impermeable barrier or shield to seal off the surface from the liquid in the system. Thus, the barrier suggested by Harwell and O'Rear, once in place, appears to be chemically inert with respect to the other components of the system.

Moreover, Harwell and O'Rear present only indirect evidence of the formation of a polymer film on the surface and then employ articles having such coated surfaces without an in situ means for repair of the coating, if damaged. By contrast, exposure of a damaged coating to the method of the present invention, can form a coating at the locus of damage, thereby repairing the coating.

According to the method of this invention, a surfactant that forms a bilayer on metal surfaces is added to a medium containing a metal surface to be protected from corrosion. The metal surface thus is understood to become coated with a surfactant bilayer as shown schematically in FIG. 1. The medium may be any liquid such as water, hydrocarbon or other liquid in any of a wide variety of systems, including sweet, sour, acidic and other systems, in which corrosion inhibition is desired.

Suitable surfactants are known and have been discussed, for example, in U.S. Pat. Nos. 4,770,906, 5,106,691 and 4,900,627 to Harwell and O'Rear and incorporated herein by reference and in the present co-pending U.S. patent application Ser. No. 07/706,661 in which the present co-inventor Shah is also a co-inventor. The surfactant molecules are of a general tadpole-like shape comprising a relatively wide "head" portion and a relatively long and narrow tail-like portion. Upon addition of the surfactant to a liquid medium containing a metal surface, the surfactant forms a double layer or "bilayer" coating or film over the surface in which the surfactant molecules line up along the surface in, for example, alternating orientation; that is, "head" toward the surface and "tail" away, "tail" toward the surface and "head" away, etc. This orientation is shown in the schematic representation of the figure, wherein the metal surface is designated as 10. The "head" portions are designated as 11 and the "tail" portions are designated as 12.

A surfactant may be selected for the particular metal surface (and charge thereof) and system to be treated. The Harwell and O'Rear patents describe the coordination required between the bilayer-forming surfactant and the system to form a bilayer. If the substrate surface is charged positively, an anionic surfactant such as sodium dodecylsulfate (SDS) and a polar solvent are used. On the other hand, if the substrate surface is charged negatively, a cationic surfactant such as cetyltrimethylammonium bromide (CTAB) is employed in a polar solvent. The polarity of the solvent causes a second layer of surfactant molecules to assemble tail-to-tail with the surfactant molecules directly adsorbed to the substrate surface.

As noted above, it is believed that the improved corrosion inhibition results from corrosion inhibitor being trapped adjacent to the metal surface by this bilayer of surfactant. Thus, an inhibitor coating is formed over the metal surface. Generally, the subject inventors believed that the inhibitor resides either between the two head portion layers of the surfactant molecules (shown generally as "A" in the figure) or directly against the surface of the metal (the position shown generally as "B" in the figure). These loci are referred to as the sites of solubilization. The site of solubilization of the inhibitor molecule in the surfactant bilayer depends upon the electrostatic interactions between the charged groups on the inhibitor and the surfactant molecules and the hydrophobic and electrostatic interactions of the inhibitor and the surfactant.

As a result, the surfactant and inhibitor should be of opposite charges unless the inhibitor has a tail; that is, a generally straight chain, substituted or unsubstituted hydrocarbon of about 10 to about 18 carbon atoms. The presence of such a tail would permit any type of inhibitor, whether cationic, anionic or non-ionic, to be used with either an anionic or cationic surfactant. The concentration of the surfactant should be sufficient to form a bilayer over the entire metal surface to be protected. Generally, a surfactant concentration on the order of one-tenth the critical micellar concentration of the surfactant has been found to be sufficient. While the optimal bilayer surfactant concentration will depend on various factors such as the surface area to be coated, a concentration of at least about 5 ppm, preferably at least about 10 ppm, more preferably at least about 20 ppm, and often about 100 ppm or even above about 1,000 ppm, such as about 500 ppm to about 3,000 ppm (all based on weight), has been found to be effective for many systems.

Certain inhibitors have been found to polymerize in situ over the metal surface to form a barrier that is extremely effective in corrosion inhibition, especially with respect to oxygen corrosion. Particular inhibitors that have been found to yield superior effectiveness in combination with bilayer surfactants are water-soluble vinyl monomers, including 4-vinyl-pyridine (with or without octanoic or octynoic acid) and vinyltriphenylphosphonium bromide (VTPB) (with or without 4-vinylpyridine), 1-vinylimidazole (with or without octanoic or octynoic acid), certain water-soluble dithiothione salts, and certain quaternary thiono-thiazine salts. As used herein, the term "soluble" means that the subject composition is soluble or at least dispersible in the medium of concern at the desired concentration and under the conditions involved, and the phrase "water soluble" means that the subject composition is soluble or at least dispersible in the aqueous medium of concern at the desired concentration. For an inhibitor, the concentration is that which is necessary to achieve the desired inhibitive effect. The term "solubilizes" means that the subject composition dissolves or disperses in the medium of concern, even if only in the presence of a bilayer, as indicated by the context of the term. The term "disperses" is intended to include the situation in which the composition collects within the bilayer as opposed to precipitation without respect to the bilayer. The optimal inhibitor concentration is highly dependent on the system, but typical concentrations are on the order of about 10 ppm to about 1,500 ppm, especially about 100 ppm to about 500 ppm (all based on weight).

Although 4-vinylpyridine is immiscible in aqueous solutions, it has been found that in the presence of the appropriate concentration of an anionic bilayer surfactant such as sodium dodecylsulfate (SDS), 4-vinylpyridine may be added without altering the appearance of a clear single-phase solution. The 4-vinylpyridine molecules have been found to form a film within the SDS bilayer over a metal surface in the solution to provide superior corrosion inhibition, especially in oxygenated, aqueous systems and also in carbon dioxide systems as well. Moreover, it has been found that the use of 4-vinylpyridine or 1-vinylimidazole in combination with 2-octynoic or octanoic acid produces superior corrosion resistance in the presence of bilayer such as of SDS in relatively low pH (e.g., less than 7) oxygenated, aqueous media. This has been found to occur even though 1-vinylimidazole, octanoic and 2-octynoic acid are not suitably corrosion inhibitive by themselves. This corrosion inhibition is believed to be unrelated to acidity alone, as octynoic and octanoic acids have been found to be significantly and surprisingly superior to situations in which vinylacetic or sulfuric acid is used in place of the octanoic or octynoic acid.

Phosphorous-containing vinyl monomer inhibitor that has been found to be surprisingly effective when used with a bilayer surfactant in such acidic, sour systems is vinyltriphenylphosphonium halide, such as vinyltriphenylphosphonium bromide (VTPB), especially in further combination with 4-vinylpyridine.

Water soluble dithio-thione salts also have been found to provide effective corrosion inhibition when incorporated into a surfactant bilayer. The dithiothiones that are the salt precursors are not water soluble and so are not applicable to aqueous systems. However, a scheme has been discovered for preparing water soluble quaternary salts of the dithiothiones. Generally, a dithio-thione of the formula:

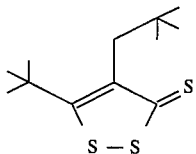

is heated at reflux with an organic halide salt of the formula R-X in an organic solvent such as methanol to produce a salt of the formula:

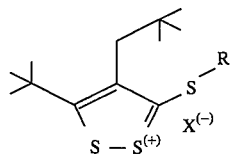

wherein $X^{\ominus}$ is halide such as chloride or bromide and R is an organic moiety that renders the salt water soluble. For example, such water solubility has been found in the cases in which the organic halide is benzyl bromide ($X^{\ominus}=Br^{\ominus}$; R=benzyl) or allyl bromide ($X^{\ominus}=Br^{\ominus}$; R=allyl). The precipitated salt may then be washed such as with ether and/or hexane. The water soluble salts formed thereby have been found to provide excellent corrosion inhibition when used in a surfactant bilayer such as formed by an anionic surfactant like sodium dodecyl sulfate, particularly when applied to oxygenated aqueous systems.

Certain other water soluble dithio-thiones have been found to be very effective corrosion inhibitors in the presence of a surfactant bilayer such as that of a cationic surfactant like cetyltrimethylammonium bromide (CTAB). In fact, such dithio-thiones have been found to be highly effective corrosion inhibitors in low pH (e.g., 3), hydrogen sulfide-containing systems. Thus, they provide a means for inhibiting corrosion effectively in systems such as refining overhead systems without the need for neutralizers as used in conventional techniques. As a result, the fouling and under deposit corrosion associated with such neutralizers may be avoided. A particular water soluble dithio-thione that has been found to be highly effective under such circumstances is 4-(p-polyethoxy)phenyl-1,2-dithiole-3-thione (PEDT). The degree of polyethoxylation is that sufficient to impart water solubility to the compound.

Certain quaternary salts of certain thiazinethiones, in particular, 4-thiono-1,2,5,6,7,8-pentahydro-3,1,2-benzothiazine-2-spirocyclohexane, have also been found to be effective inhibitors when used in combination with a surfactant bilayer. It is believed that these salts are novel, and were synthesized for the newly discovered utility in combination with a surfactant bilayer. Oxygen corrosion at the metal surface has been found to initiate polymerization of these salts automatically to form a polymer coating within the bilayer. Once this coating is formed, corrosion is essentially halted, halting the polymerization at an optimal point. Thus, an extremely convenient and effective oxygen corrosion inhibitor is provided. The salt is also an effective corrosion inhibitor in combination with a bilayer surfactant against other types of corrosion, such as carbon dioxide corrosion, although without polymerization. The anionic surfactant SDS has, in particular, been found to be an effective surfactant for use with the salts.

Quaternary salts may be prepared from tetrahydropyrimidine (THP) of the formula

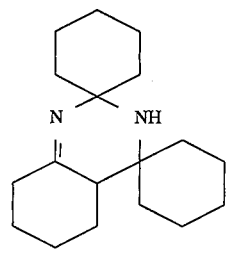

as follows. Carbon disulfide is mixed with THP and an organic solvent such as ether to form a carbon sulfide adduct in the form of a precipitate, which may then be separated such as by filtration. The adduct may be heated with an acid such as glacial acetic acid to form 4-thiono-1,2,5,6,7,8-pentahydro-3,1,2-benzothiazine-2-spirocyclohexane (TPBS). The TPBS then may be quaternized with an organic halide in the presence of an organic solvent such as methanol to form the quaternary salt. The organic halide may be of the form R-X, wherein X is a halide such as chloride or bromide and R is an organic moiety that may provide a polymerization site, for example, cyclohexenyl, —CH$_2$CH:CHCH$_3$, —CH$_2$CH:CHCOOEt, —CH$_2$CH:CHPh, —CH$_2$CH:CH$_2$, —CH$_2$CH(CH$_3$):CH$_2$ or —CH$_2$C≡CH. In these formulae, Et represents ethyl and Ph represents phenyl. In addition, it has been found that excellent corrosion inhibition when the hydrogen on the nitrogen is replaced such as with a dodecyl group.

Thus, the resulting salt is of the formula:

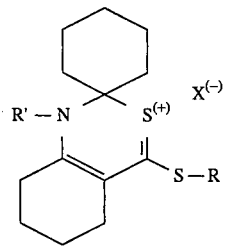

wherein $X^{\ominus}$ is $Cl^{\ominus}$ or $Br^{\ominus}$, R is as defined in the previous paragraph and R' is H or an organic moiety, preferably a generally straight chain of from about 10 to about 18 carbon atoms, especially a generally straight hydrocarbon chain of from about 10 to about 18 carbon atoms, such as a dodecyl group.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples, all percentages and parts per million (ppm) are given on a weight basis unless otherwise indicated.

EXAMPLE 1

A stock solution of commercially available 4-vinylpyridine (3 ml) was added to an aqueous solution (350 ml) containing sodium dodecyl sulfate (SDS) (44 ppm), $CaCl_2 \cdot H_2O$ ($[Cl^\ominus]$=270 ppm) and $Na_2SO_4$ ($[SO_4^{-2}]$=290 ppm), and the solution was then stirred. A clear solution resulted within a few minutes. Two further solutions were prepared, with the only difference from the first solution being that the amount 4-vinylpyridine added to one of the two further solutions was 5 ml and the amount of 4-vinylpyridine added to the other was 7 ml instead of 2 ml. The three resulting solutions and one control solution without 4-vinylpyridine or SDS were then sparged with air, mild steel (AISI 1018) electrodes were immersed therein and the corrosion rates were monitored overnight (about 22 hours) while the solutions were sparged continuously with air. The average corrosion rates were determined by integration of the corrosion rates measured during this period with a PAIR meter. The experiment was repeated for 3 ml of pyridine instead of 4-vinylpyridine. Further experiments were conducted with 3, 7 and 10 ml of 4-vinylpyridine added to 700 ml aqueous solutions in which the $[Cl^\ominus]$ was 3500 ppm and the $[SO_4^{-2}]$ was 2500 ppm and to such a solution in which no 4-vinylpyridine was added. The results obtained are shown in the tables below, wherein "ml 4-VP" refers to the milliliters of 4-vinylpyridine added to the solution, "ave. corrosion rate" refers to the average corrosion rate in mpy over the test period and "final corrosion rate" refers to the corrosion rate at the end of 20 hours. The reference to 3 ml P refers to the test in which pyridine (3 ml) was added instead of 4-vinylpyridine.

For 350 ml solution containing 270 ppm $Cl^\ominus$ and 290 ppm $SO_4^{-2}$:

| ml 4-VP | Average Corrosion Rate | Final Corrosion Rate |
| --- | --- | --- |
| 0 | 22 | 20 |
| 3 | 6 | 8 |
| 5 | 1 | 2 |
| 7 | 0.4 | 0.1 |
| 3 ml P | 20 | about 18 |

For 350 ml solution containing 3500 ppm $Cl^\ominus$ and 2500 ppm $SO_4^{-2}$:

| ml 4-VP | Average Corrosion Rate | Final Corrosion Rate |
| --- | --- | --- |
| 0 | 60 | 55 |
| 3 | 52 | 44 |
| 7 | 15 | 21 |
| 10 | 12 | 13 |

EXAMPLE 2

Standard kettle tests were carried out in brine comprising 4% sodium chloride, about 0.5% calcium chloride and about 0.25% magnesium chloride. For each test, a selected amount of 4-vinylpyridine (0.5 ml for the first test and 0.1 ml for the second), octanoic acid (0.1 ml for the first test and 0.05 for the second) and 0.1M sodium dodecyl sulfate (0.5 ml for each test) were added to a sample (675 ml) of the brine and ISOPAR-M® (200 ml). The brine was then sparged with carbon dioxide for about two hours at 50° C., whereupon carbon steel electrodes were immersed in the brine and the corrosion rate monitored for about 22 hours under carbon dioxide atmosphere. In both tests, the spent solution was clear and two distinct, apparently emulsion-free phases were visible. Excellent corrosion protection was observed. The electrodes appeared clean. The integrated average corrosion rate was determined to be about 6 mpy in the first test and about 8 mpy in the second test. In the first test, the corrosion rate dropped below 10 mpy within about two hours and below 6 mpy within about six hours. The final corrosion rate in the first test was about 3 mpy. In the second test, the corrosion rate dropped below 10 mpy within about three hours and below about 5 mpy within about eight and one-half hours. The corrosion rate after about 19.7 hours in the second test was about 4 mpy.

EXAMPLE 3

Corrosion inhibition in salt solutions as employed in Example 1, but of lower pH (i.e., about 6.5 as opposed to about 8) was investigated. Calcium chloride (5 grams) and sodium sulfate (4 grams) were dissolved in water (2 liters) to form a stock solution. Three carbon steel electrodes were placed in a sample (325 ml) of the stock solution and the corrosion rate monitored while air was sparged through the solution overnight. The pH was measured as about 6. The test was ended after nearly 24 hours, at which time the pH was measured as 6.9 and a substantial amount of orange corrosion product suspension was noted. The electrodes were also covered with a patchy layer of orange corrosion product. The integrated average corrosion rate was found to be about 39 mpy.

An aliquot (0.5 ml) of an aqueous 0.1M sodium dodecyl sulfate solution and an aliquot (3 ml) of 4-vinylpyridine were stirred well into a second sample (325 ml) of the stock solution. The resulting solution had a pH of 8. Three carbon steel electrodes were immersed into the resulting solution and the corrosion rate was monitored while the resulting solution was sparged with air overnight. After nearly 24 hours, the spent solution contained a smaller amount of orange suspension than noted with the previous test. The pH was measured as 7.4. The electrodes were mostly clean, although some crevice corrosion product was noted near the O-ring. The integrated average corrosion rate was found to be about 12 mpy.

An aliquot (0.5 ml) of an aqueous 0.1M sodium dodecyl sulfate solution, an aliquot (3 ml) of 4-vinylpyridine and octynoic acid (0.5 ml) were stirred well into a third sample (325 ml) of the stock solution. The resulting solution had a pH of 6.5. Three carbon steel electrodes were immersed into the resulting solution and the corrosion rate was monitored while the resulting solution was sparged with air overnight. After nearly 24 hours, the spent solution appeared clean and contained no noticeable orange suspension than noted with the previous test. The pH was measured as 7. The electrodes appeared clean, with very little crevice corrosion product noted near the O-ring. The integrated average corrosion rate was found to be about 0.73 mpy.

An aliquot (0.5 ml) of an aqueous 0.1M sodium dodecyl sulfate solution and an aliquot (3 ml) of 4-vinylpyridine were stirred well into a fourth sample (325 ml) of the stock solution. The resulting solution had a pH of 8.2. Sulfuric acid (5% solution) was added until the pH of the solution was adjusted to 6.5. Three carbon steel electrodes were immersed into the resulting solution and the corrosion rate was monitored while the resulting solution was sparged with air overnight. After about 10 hours, the corrosion rate suddenly increased to about 107 mpy, very quickly dropped to about 50 mpy and then decreased slowly. After nearly 24 hours, the spent solution contained an orange suspension and the electrodes were covered with orange corrosion product. The pH was measured as 7. The integrated average corrosion rate was found to be about 25 mpy.

EXAMPLE 4

An aliquot (3 ml) of 4-vinylpyridine and octanoic acid (0.5 ml) were stirred into a sample (325 ml) of a stock solution prepared as set forth in Example 3 above. A white precipitate formed. The solution was filtered into a beaker containing 0.1M sodium dodecyl sulfate (0.5 ml) and stirred. The solution turned hazy with a fine white suspension and had a pH of 7.4. Three carbon steel electrodes were immersed into the resulting solution and the corrosion rate was monitored while the resulting solution was sparged with air overnight. The spent solution was still as hazy as at the beginning of the setting period and the pH was measured as about 7.5. The electrodes appeared very clean. The integrated average corrosion rate was found to be about 1.4 mpy.

An aliquot (0.5 ml) of 0.1M sodium dodecyl sulfate, an aliquot (3 ml) of 4-vinylpyridine and octanoic acid (0.5 ml) were stirred into a sample (325 ml) of the stock solution. A white precipitate formed. The solution was filtered into a beaker. Three carbon steel electrodes were immersed into the filtrate and the corrosion rate was monitored while the resulting solution was sparged with air overnight. The spent solution was completely clear and the electrodes appeared very clean. The pH was measured as about 7.5. The integrated average corrosion rate was found to be about 7.5 mpy.

An aliquot (0.5 ml) of 0.1M sodium dodecyl sulfate, an aliquot (3 ml) of 4-vinylpyridine and vinylacetic acid ($CH_2$=$CHCH_2COOH$) (0.5 ml) were stirred into a sample (325 ml) of the stock solution. A clear solution of pH=7. resulted. Three carbon steel electrodes were immersed into the filtrate and the corrosion rate was monitored while the resulting solution was sparged with air overnight. The spent solution had a substantial amount of suspended orange corrosion product and the electrodes were covered with orange corrosion product. Computer problems ended this test prematurely.

EXAMPLE 5

Tests following the procedures of Examples 3 and 4 above were conducted with aqueous solutions of 1-vinylimidazole in place of 4-vinylpyridine. The results obtained from these tests in the presence of SDS are shown in the following table, wherein the entries in the column labelled "Inhibitor" identify the milliliters of the noted inhibitor component added to the sample (325 ml) of stock solution prepared as set forth in Example 3 above, the entries in the column labelled "Corr. Rate" identify the integrated average corrosion rates as measured over a period of about 22 hours with a PAIR meter and 1-VI refers to 1-vinylimidazole.

| Inhibitor | Starting pH | pH of the Spent Solution | Corr. Rate |
| --- | --- | --- | --- |
| Blank | 6 | 6.9 | 40 |
| 3 ml 1-VI | 9 | 7.5 | 19 |
| 0.5 ml octynoic acid | 3.5 | 6 | 38 |
| 3 ml 1-VI + 0.5 ml octynoic acid | 6.5 | 6.6 | 2.7 |
| 3 ml 1-VI + 0.5 ml octanoic acid | 7.5 | 7.5 | 1.8 |

EXAMPLE 6

A water soluble salt of 4-neopentyl-5-t-butyl-1,2-dithiol-3-thione was synthesized and tested for corrosion inhibitive properties. A mixture of 4-neopentyl-5-t-butyl-1,2-dithiol-3-thione (26 grams) and allyl bromide (12 ml) in methanol (100 ml) was heated under reflux for four hours. A deep brown mixture resulted. Removal of the methanol by vacuum left a yellow paste. Ether (100 ml) and hexane (100 ml) were added to the paste, and the resulting mixture was stirred rapidly for five minutes, set aside for an hour (until a heavy precipitate was visible) and filtered with suction. After washing with ether and hexane, the resulting yellow powder was air dried to obtain a water-soluble salt (30 grams) having a melting point of 94°–95° C., representing a 78% yield. Analysis indicated that the salt had the following structure:

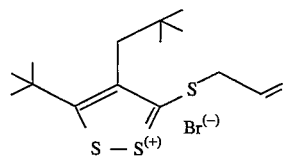

Corrosion tests were carried out in aqueous solutions containing calcium chloride and sodium sulfate. The solutions were sparged continuously with air. In the absence of an inhibitor the integrated average corrosion rates over a period of about 22 hours were determined to be about 53 mpy. In the presence of about 300 ppm of the allyl bromide salt of 4-neopentyl-5-t-butyl-1,2-dithiol-3-thione, the integrated average corrosion rate was determined to be about 42 mpy, lower than without the salt, but still unacceptable. In the presence of about 300 ppm of the salt and about 50 ppm of sodium dodecyl sulfate, the integrated average corrosion rate was determined to be about 3 mpy.

EXAMPLE 7

Laboratory tests of the salt of Example 6 were carried out according to the method of Example 6, but were carried out on oil field brine sparged for two hours with a gas mixture of carbon dioxide with low concentration of oxygen. In one run, no inhibitor was added, while the other run was conducted with 200 ppm of the salt of Example 6. The corrosion rate for the blank trial was about 450 mpy for the first several hours, tapering off to about 350 mpy at about 22 hours. The corrosion rate for the trial in which 200 ppm of the allyl salt of Example 6 was used remained generally steady over the 22 hours at about 40–50 mpy.

EXAMPLE 8

A water soluble salt of 4-neopentyl-5-t-butyl-1,2-dithiol-3-thione was synthesized and tested for corrosion inhibitive properties. A mixture of 4-neopentyl-5-t-butyl-1,2-dithiol-3-thione (3 grams), benzyl bromide (2.0 grams) and methanol (20 ml) was heated under reflux for six hours. Solvents were then evaporated under a vacuum to yield a brown paste. Hexane (10 ml) and ether (10 ml) were added and the resulting mixture stirred rapidly for five minutes. The mixture was then set aside for an hour and the resulting powdery solid was filtered with suction and washed with ether. The orange-brown powder thereby produced was air dried to obtain a water-soluble salt (2.8 grams) having a melting point of about 81° C. and representing a yield of about 57%. Analysis indicated that the salt had the following structure:

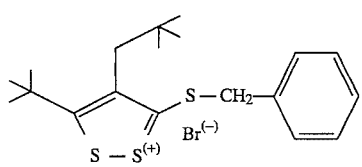

Corrosion tests were carried out in aqueous solutions as described in Example 6, above. In the presence of about 300 ppm of the benzyl bromide salt of 4-neopentyl-5-t-butyl-1,2-dithiol-3-thione, the integrated average corrosion rate was determined to be about 44 mpy, lower than without the salt, but still unacceptable. In the presence of about 300 ppm of the salt and about 50 ppm of sodium dodecyl sulfate, the integrated average corrosion rate was determined to be about 4 mpy.

EXAMPLE 9

Corrosion inhibition tests were conducted on carbon steel in a sour system containing 0.1M sodium sulfate and having a pH of 3. Integrated average and steady state corrosion rates were determined for the system with no inhibitor added, for the system containing 50 ppm of the water soluble dithiothione 4-(p-polyethoxy)phenyl-1,2-dithiole-3-thione (PEDT) and for the system with 50 ppm PEDT in combination with 50 ppm of the bilayer surfactant cetyltrimethylammonium bromide (CTAB). A test was also run on the system with no PEDT, but with 50 ppm CTAB. The results are set forth in the table below. Trials 1, 2, 3 and 5 were conducted over about 22 hours. Trial 4 was conducted over nearly 70 hours.

|       |            | Weight     | Corrosion Rate (mpy) |              |
|-------|------------|------------|----------------------|--------------|
| Trial | Inhibitor  | Loss (mpy) | Average              | Steady State |
| 1     | Blank      | 400        | 300                  | —            |
| 2     | PEDT       | —          | 114                  | 95           |
| 3     | PEDT + CTAB| 11.5       | 13.6                 | 7            |
| 4     | PEDT + CTAB| 6.2        | 8.9                  | 5            |
| 5     | CTAB       | —          | about 65             | about 20     |

EXAMPLE 10

Quaternary salts of 4-thiono-1,2,5,6,7,8-pentahydro-3,1,2-benzothiazine-2-spirocyclohexane were prepared as follows. Carbon disulfide (6 ml) was added quickly to a stirred solution of tetrahydropyrimidine (THP) of the formula:

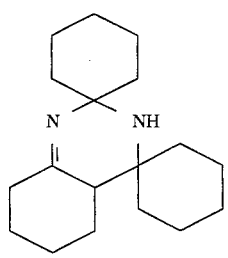

(14 grams) in ether (25 ml of a 2M solution). The resulting pale yellow solution was stirred for an hour (while the reaction was monitored by TLC), by which time a heavy yellow precipitate formed. The precipitate was filtered out, washed with ether (20 ml) and dried under a vacuum to yield the carbon sulfide adduct (12 grams, having a melting point of about 120°–122° C. and representing a 67% yield) of the THP. More of this adduct was prepared by the same method. The adduct (21 grams) was heated on a steam bath with glacial acetic acid (125 ml) for 30 minutes. The yellow powder initially dissolved and near the end of the 30 minutes, orange red flakes precipitated. The mixture was cooled to room temperature and filtered. The orange powder was crystallized from methanol to give orange plates to form 4-thiono-1,2,5,6,7,8-pentahydro-3,1,2-benzothiazine-2-spirocyclohexane (TPBS) (11 grams, having a melting point of 197° C. and representing a yield of 72%). The TPBS was then quaternized. A mixture of the TPBS (1 gram), benzyl chloride (0.5 ml) and methanol (10 ml) was heated to gentle reflux on a steam bath for an hour. The pale yellow solution was evaporated under a vacuum to give a yellow powder, which was then stirred with ether (10 ml) and filtered to give pale yellow flakes (1.1 grams having a melting point of about 187°–188° C. and representing a 70% yield). Analysis of the product indicated the following formula:

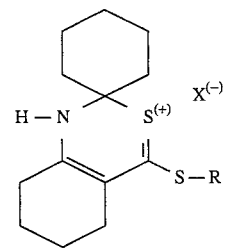

in which X is Cl and R is

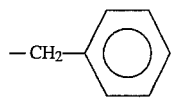

EXAMPLE 11

TPBS prepared as set forth in Example 10, above, was quaternized as follows. A mixture of the TPBS (0.65 grams), crotyl chloride (0.3 ml) and methanol (10 ml) was heated to gentle reflux on a steam bath for an hour. The clear yellow solution was concentrated under a vacuum to give a yellow paste, which was then triturated with ether (20 ml) to give a yellow powder (0.9 grams, representing a 95% yield). Analysis of the product indicated the formula identified in Example 10, above, wherein X is Cl and R is —$CH_2CH=CHCH_3$. Corrosion tests were conducted over 22 hours. In the presence of 300 ppm of this compound without a surfactant bilayer, the corrosion rate dropped from about 52 mpy to about 10 mpy in about 7 hours and decreased slowly, never dropping below 3 mpy. The average corrosion rate was 12 mpy. For the compound (300 ppm) in an SDS bilayer, the corrosion rate rapidly dropped to about 5 mpy within the first five hours and the average corrosion rate was reduced to 2 mpy. The formation of a black polymeric film on the metal surface was noted in the SDS trial.

EXAMPLE 12

TPBS prepared as set forth in Example 10, above, was quaternized as follows. A mixture of the TPBS (3 grams), ethyl 4-bromocrotonate (1.65 ml) and methanol (25 ml) was heated to gentle reflux on a steam bath for 30 minutes. The clear yellow solution was evaporated under a vacuum to give a yellow-orange paste, which was then stirred with ether (40 ml) and filtered to give yellow flakes (4.5 grams having a melting point of about 165°–168° C. and representing a 94% yield). Analysis of the product indicated the formula identified in Example 10, above, wherein X is Br and R is —$CH_2CH=CHCOOC_2H_5$. Corrosion tests were conducted over 22 hours. In the presence of 300 ppm of this compound without a surfactant bilayer, the corrosion rate dropped from about 50 mpy to about 10 mpy in about 12 hours and decreased slowly, never dropping below 7 mpy. The average corrosion rate was 17 mpy. For the compound (300 ppm) in an SDS bilayer, the corrosion rate rapidly dropped to below 5 mpy within the first five hours and the average corrosion rate was reduced to 2 mpy. The formation of a black polymeric film on the metal surface was noted in the SDS trial.

EXAMPLE 13

TPBS prepared as set forth in Example 10, above, was quaternized as follows. A mixture of the TPBS (1.3 grams), cinnamyl bromide (1.1 ml) and methanol (15 ml) was heated to gentle reflux on a steam bath for 20 minutes. The pale yellow solution was evaporated to give a yellow solid mass, which was then washed with ether (20 ml) and filtered to give yellow flakes (2.1 grams having a melting point of about 180°–181° C. and representing a 92% yield). Analysis of the product indicated the formula identified in Example 10, above, wherein X is Br and R is —$CH_2CH=CHPh$ (in which Ph represents phenyl). The compound dissolved in water, but immediately thereafter, a heavy suspension formed. The suspension slowly deposited on the electrode surface, reducing the corrosion rate, but not to an acceptable level. The presence of SDS facilitated hydrolysis. Thus, it had little effect on the corrosion rate.

EXAMPLE 14

TPBS prepared as set forth in Example 10, above, was quaternized as follows. A mixture of the TPBS (1.25 grams), allyl bromide (0.5 ml) and methanol (15 ml) was heated to gentle reflux on a steam bath for 30 minutes. The clear yellow solution was concentrated under a vacuum to give yellow crystalline flakes, which were then washed with ether (10 ml) and filtered to give yellow flakes (1.6 grams, representing a 92% yield). Analysis of the product indicated the formula identified in Example 10, above, wherein X is Br and R is —$CH_2CH=CH_2$.

EXAMPLE 15

TPBS prepared as set forth in Example 10, above, was quaternized as follows. A mixture of the TPBS (1.25 grams), 1-bromo-2-methyl propene (0.6 ml) and methanol (20 ml) was heated to gentle reflux on a steam bath for 2 hours. The pale yellow solution was concentrated under a vacuum to give a yellow gum, which was then mixed with ether (100 ml) and filtered to give deep yellow flakes (1.45 grams having a melting point of 125° C. representing a 84% yield). Analysis of the product indicated the formula identified in Example 10, above, wherein X is Br and R is —$CH_2C(CH_3)=CH_2$.

EXAMPLE 16

TPBS prepared as set forth in Example 10, above, was quaternized as follows. Tetrabutyl ammonium bromide (50 mg) was added to a red suspension of the TPBS (0.7 grams) in methylene chloride (5 ml) and the mixture was stirred rapidly at room temperature while propargyl chloride (0.23 ml) was added. Then 4N sodium hydroxide (0.81 ml) was added quickly. The red suspension turned to a pale yellow solution in three minutes. After five more minutes, the reaction was diluted with water (10 ml) and extracted with ether (2×20 ml). The organic extract was then dried over anhydrous sodium carbonate. Evaporation of the solvent gave the thio-ether (0.95 grams, representing a yield of 90%) as a pale yellow oil.

EXAMPLE 17

Corrosion rates for several tests were measured over about 22 hours by using for each test three mild steel (AISI 1018) electrodes of 9 cm² surface area each. The electrodes were immersed in a triangular arrangement in an aqueous solution of a given concentration of calcium chloride dihydrate and sodium sulfate. The solution was sparged with air throughout the experiment and the pH of the electrolytic solution was maintained below 6. Several runs were conducted to compare various inhibitors to blanks. By this method, it was found that the corrosion rate for the compound of the formula

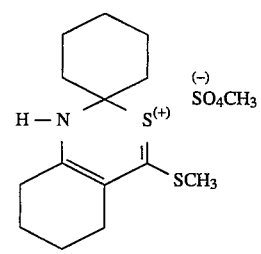

was about 60 mpy for the first four hours, dropping gradually to a steady state level of about 20 mpy at about 16 hours, which showed it to be slightly more corrosive than the blank. However, when SDS was included (at a concentration of about a tenth that of the critical micellar concentration) with the compound above, the corrosion rate dropped from about 40 mpy to less than 20 mpy within the first two hours, reaching a state rate of about 10 mpy. Replacement of the SDS with cetyltrimethylammonium bromide (CTAB) resulted in a corrosion rate profile similar to that without a bilayer surfactant.

It was found that the corrosion rate in the presence of about 430 ppm of the compound of Example 10, above, the steady state corrosion rate was 9 mpy, compared to 38 mpy for the blank. At the end of the test in the presence of the compound of Example 10, the electrodes were found to be covered with a layer of crystalline deposit and a small amount of solid was floating at the surface of the solution and settled on the bottom. Analysis of the solid in the solution suggests that it corresponds to the formula

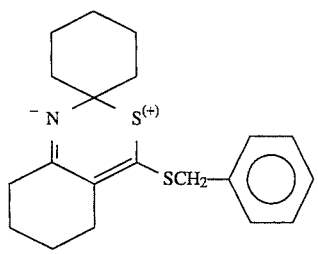

The formation of this unprotonated analogue upon addition of the compound of Example 10 to water is believed to result in the formation of hydrochloric acid, thereby reducing the pH from 6 to 4 in the test.

The tests were then carried out on the compound of Example 14, above. This compound was found to reduce the corrosion rate to some extent, but not to an acceptable level. At the test end, the electrodes were covered with an orange-brown corrosion product layer with a few black patches of a viscous product on it and, mostly, on the stir bar in the solution. This product was soluble in acetone, but insoluble in water, and is believed to be polymeric by virtue of the vinyl groups in the tested compound.

EXAMPLE 18

A compound of the formula set forth in Example 10, above, in which X is Cl and R is —$CH_2C{\equiv}CH$ was tested. In the presence of 300 ppm of this compound, the average corrosion rate over a 22 hour test was found to be 21 mpy. However, when SDS was included, the average corrosion rate dropped to 3 mpy.

EXAMPLE 19

A compound of the formula set forth in Example 10, above, in which X is Cl and R is —$CH_3$ was tested. In the presence of this compound in combination with SDS, the average corrosion rate over a 22 hour test was found to be 2 mpy. Although the compound of Example 10 has no unsaturation, a protective layer that appeared to be polymeric, similar to the layer formed in Example 11, above, formed.

EXAMPLE 20

A compound of the formula set forth in Example 10, above, in which R is a cyclohexenyl group. In corrosion rate tests, a suspension formed as discussed in Example 13, above. In the presence of SDS, a corrosion rate of 2 mpy was observed. The electrodes were covered with a black viscous coating that was in turn covered with a yellow layer.

EXAMPLE 21

A compound of the formula set forth in Example 10, above, in which R is —$CH_2CH{=}CH_2$ and a dodecyl group was bound to the nitrogen in place of the hydrogen was tested. Upon addition to the test solution, even though the composition was unsaturated, poor corrosion protection suggested that no polymerization took place. However, a water insoluble oily product was formed that, upon acidification to a pH of 4, partially dissolved, with the remainder suspended as an emulsion except in the presence of SDS. Good corrosion inhibition was obtained only in the presence of a surfactant bilayer of SDS, in which case the inhibition was excellent. However, while an oily coating formed over the electrodes, the pitting rate was measured at 80 mpy, and when the oily material was filtered out, the pitting rate was 800 mpy, suggesting that only polymeric coatings are effective against both general as well as localized corrosion.

EXAMPLE 22

A compound of the formula identified in Example 21, above, except that R was benzyl, was tested. As with the compound of Example 21, partial dissolution was effected only upon acidification and the emulsion of oily material coated the electrode in the presence of an SDS bilayer, thereby providing excellent corrosion protection.

EXAMPLE 23

A compound of the formula shown in Example 10, above, in which R was dodecyl, was tested. The compound was a solid that dissolved in water to give a suspension, suggesting the possibility of hydrolytic decomposition. The suspension slowly deposited on the electrode surface, but provided poor protection. The same results were noted in the presence of SDS.

EXAMPLE 24

The compounds of Examples 19 and 20, above, both of which exhibited acceptable corrosion inhibition, were tested for effectiveness against localized corrosion or pitting. Although the compound of Example 20 showed some protection against pitting (about 80 mpy), the compound of Example 19, which polymerizes, showed more effective protection against pitting (about 13 mpy).

EXAMPLE 25

The results of the corrosion tests on the previous examples are set forth in the table below in which the corrosion rate is measured in mpy, the columns marked "SB" represent the tests in the presence of the SDS bilayer, the columns marked "Aqueous" represent tests without the bilayer, and weight loss is measured in mpy.

| Inhibitor from Example # | Corrosion Rate | | Weight Loss | |
| --- | --- | --- | --- | --- |
| | SB | Aqueous | SB | Aqueous |
| 13 | 22 | 17 | 26 | 31 |
| 19 | 2 | 15 | 10 | 15 |
| 20 | 2 | 8 | 8 | 12 |
| 21 | 2 | 32 | 9 | 49 |
| 22 | 1 | 19 | 7 | 38 |
| 23 | 35 | 27 | 51 | 48 |

EXAMPLE 26

Carbon dioxide corrosion tests were carried out for about 22 hours on the thiazine thiones of Examples 11 and 14 and on a combination of vinylpyridine (5 ml) and octynoic acid (1.08 ml) in a two phase (water and hydrocarbon) system. The results are shown in the following table, in which the corrosion rate and weight loss are given in mpy and VPO indicates the vinylpyridine and octynoic acid combination.

| Inhibitor | Corrosion Rate | Weight Loss |
| --- | --- | --- |
| Blank | 121 | 48 |
| Example 11 | 5 | 8 |
| Example 14 | 4 | 5 |
| VPO | 5 | 4 |

EXAMPLE 27

Corrosion tests in sour systems of pH 3 were carried out on vinyltriphenylphosphonium bromide (VTPB) with and without 4-vinylpyridine (VP), with SDS as the bilayer surfactant. Sodium sulfate (8.52 grams) and isopar-M (300 ml) were added to deionized water (600 ml). The resulting solution was sparged with 1% hydrogen sulfide and maintained at a pH=3 and a temperature of 160° F. for an hour. Then VP (0.4 ml) was added, raising the pH to about 4. The pH was adjusted back to about 3 and after about 15 minutes, three carbon steel electrodes were immersed and the corrosion rate was monitored. In about eight hours, the corrosion rate dropped from about 500 mpy to about 180 mpy. The rate then decreased slowly, but never dropped below about 110 mpy over the course of the test, 46 hours. At the end of the test, the hydrocarbon and aqueous phases separated readily and appeared clear. The integrated average corrosion rate was about 147 mpy and the steady state rate reached about 120 mpy. The test was then repeated, except that 0.1M SDS (1.38 ml) was also added to the solution. The corrosion rate dropped from about 250 mpy to less than 100 mpy within two hours. After 21 hours, the corrosion rate appeared to reach steady state at about 6 mpy and the pH was about 2.3. At about 28 hours, the pH was adjusted to about 1.6. The corrosion rate increased to about 28 mpy and dropped slowly to about 25 mpy at about 46 hours, at which time the pH was about 1. At the end of the test the hydrocarbon and aqueous phases separated very cleanly.

These tests, with and without SDS, were then repeated, except with VTPB (0.18 grams) added instead of VP. Without SDS, the corrosion rate dropped from about 200 mpy to about 120 mpy. The rate then decreased slowly to about 60 mpy at about 20 hours. The integrated average corrosion rate was 80 mpy and the two phases were clear. With SDS, the corrosion rate dropped from about 80 mpy to less than 40 mpy by about 20 hours. The corrosion rate continued to drop to less than about 13 mpy to produce an integrated average corrosion rate of about 20 mpy.

The tests were repeated with various combinations of VP and VTPB, each test with SDS, to give the results shown in the following table.

| | Corrosion Rate (mpy) | |
| --- | --- | --- |
| Inhibitor(s) | Average | Steady State |
| Blank | 400 | 300 |
| 100 ppm VP + 25 ppm VTPB* | 27 | <10 |
| 100 ppm VP + 25 ppm VTPB* | 17 | 7 |
| 100 ppm VP + 50 ppm VTPB | 11 | 4 |
| 200 ppm VTPB | 20 | <13 |
| 100 ppm VTPB | 35 | <18 |
| 50 ppm VTPB | 39 | <18 |

*Two separate trials of this combination.

The test was also conducted with 100 ppm VP and 25 ppm VTPB, and tap water in place of the sodium sulfate and deionized water. The average corrosion rate was 2 mpy, with a steady state rate of less than 1 mpy.

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A method for inhibiting oxygen corrosion of a metal surface in a liquid medium, the method comprising incorporating into the medium an oxygen corrosion inhibiting amount of a combination of a surfactant that forms a bilayer on the metal surface in the medium and a corrosion inhibitor that is capable of undergoing polymerization initiated by a corrosion reaction of the metal surface and that solubilizes in the medium in the presence of the surfactant, the surfactant being incorporated into the medium in a concentration sufficient to produce a bilayer on the metal surface in the medium, the combination being selected from the group consisting of:

a. an anionic surfactant that forms a bilayer on the metal surface and a cationic corrosion inhibitor;

b. a cationic surfactant that forms a bilayer on the metal surface and an anionic corrosion inhibitor;

c. an ionic surfactant that forms a bilayer on the metal surface and an ionic corrosion inhibitor having a pendent, generally straight chain hydrocarbon or substituted hydrocarbon moiety of from about 10 to about 18 carbon atoms; and d. an ionic surfactant that forms a bilayer on the metal surface and a non-ionic corrosion inhibitor.

2. A method for inhibiting corrosion of a metal surface in a liquid medium, the method comprising incorporating into the medium a corrosion inhibiting amount of a combination of a surfactant that forms a bilayer on the metal surface in the medium and a corrosion inhibitor that solubilizes in the medium in the presence of the surfactant, the surfactant being incorporated into the medium in a concentration sufficient to produce a bilayer on the metal surface in the medium, the corrosion inhibitor being selected from the group consisting of (i) 4-vinylpyridine, (ii) vinylimidazole, (iii) a water soluble dithio-thione salt having the formula

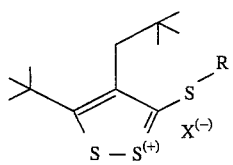

wherein $X^{\ominus}$ is a halide selected from the group consisting of chloride and bromide, and R is an organic moiety that renders the salt water soluble, (iv) a water soluble 4-(p-polyethoxy)phenyl1,2-dithiole-3-thione, and (v) a water soluble quaternary salt of a thiazine-thione, the salt being susceptible to polymerization activated by oxygen corrosion of a ferrous metal the combination corresponding to a coordination scheme selected from the group consisting of:

a. an anionic surfactant that forms a bilayer on the metal surface and a cationic corrosion inhibitor;

b. a cationic surfactant that forms a bilayer on the metal surface and an anionic corrosion inhibitor;

c. an ionic surfactant that forms a bilayer on the metal surface and an ionic corrosion inhibitor having a pendent, generally straight chain hydrocarbon or substituted hydrocarbon moiety of from about 10 to about 18 carbon atoms; and d. an ionic surfactant that forms a bilayer on the metal surface and a non-ionic corrosion inhibitor.

3. A method as set forth in claim 2, wherein oxygen corrosion is inhibited and the corrosion inhibitor is one that is capable of undergoing polymerization initiated by a corrosion reaction of the metal surface.

4. A method as set forth in claim 2 wherein the corrosion inhibitor comprises 4-vinylpyridine.

5. A method as set forth in claim 4 wherein the surfactant is anionic.

6. A method as set forth in claim 5 wherein the surfactant is sodium dodecyl sulfate.

7. A method as set forth in claim 6 wherein the inhibitor further comprises an acid selected from the group consisting of octynoic acid and octanoic acid.

8. A method as set forth in claim 2 wherein the surfactant has a critical micellar concentration and the amount of surfactant incorporated into the fluid is sufficient to result in a surfactant concentration in the fluid of about one-tenth the critical micellar concentration of the surfactant.

9. A method as set forth in claim 2 wherein the corrosion inhibitor comprises vinylimidazole.

10. A method as set forth in claim 9 wherein the surfactant is anionic.

11. A method as set forth in claim 10 wherein the surfactant is sodium dodecyl sulfate.

12. A method as set forth in claim 2 wherein the corrosion inhibitor is a water soluble dithio-thione salt having the formula

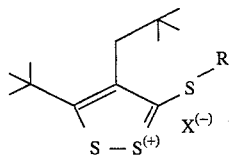

wherein $X^{\ominus}$ is a halide selected from the group consisting of chloride and bromide, and R is an organic moiety that renders the salt water soluble.

13. A method as set forth in claim 11 wherein R is selected from the group consisting of —CH$_2$CH:CH$_2$ and benzyl.

14. A method as set forth in claim 12 wherein the surfactant is anionic.

15. A method as set forth in claim 12 wherein the surfactant is sodium dodecyl sulfate.

16. A method as set forth in claim 2 wherein the corrosion inhibitor is a water soluble 4-(p-polyethoxy)phenyl-1,2-dithiole-3-thione.

17. A method as set forth in claim 16 wherein the surfactant is cationic.

18. A method as set forth in claim 17 wherein the surfactant is cetyltrimethylammonium bromide.

19. A method as set forth in claim 2 wherein the corrosion inhibitor is a water soluble quaternary salt of a thiazine-thione, the salt being susceptible to polymerization activated by oxygen corrosion of a ferrous metal.

20. A method as set forth in claim 19 wherein the thiazine-thione is 4-thiono-1,2,5,6,7,8-pentahydro-3,1,2-benzothiazine-2-spirocyclohexane.

21. A method as set forth in claim 20 wherein the salt corresponds to the formula

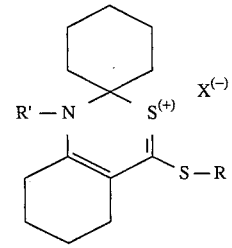

wherein $X^{\ominus}$ is chloride or bromide, R is an organic moiety that is capable of serving as a polymerization linkage site and R' is hydrogen or a generally straight chain organic moiety of from about 10 to about 18 carbon atoms.

22. A method as set forth in claim 21 wherein R' is a hydrocarbon chain.

23. A method as set forth in claim 22 wherein R is selected from the group consisting of cyclohexenyl, —CH$_2$CH:CHCH$_3$, —CH$_2$CH:CHCOOEt, —CH$_2$CH:CHPh, —CH$_2$CH:CH$_2$, —CH$_2$CH(CH$_3$):CH$_2$ or —CH$_2$C≡CH.

24. A method as set forth in claim 23 wherein R is —CH$_2$CH═CH$_2$ and R$^1$ is dodecyl.

25. A method as set forth in claim 21 wherein R$^1$ is hydrogen.

26. A method as set forth in claim 25 wherein R is selected from the group consisting of cyclohexenyl, —CH$_2$CH:CHCH$_3$, —CH$_2$CH:CHCOOEt, —CH$_2$CH:CHPh, —CH$_2$CH:CH$_2$, —CH$_2$CH(CH$_3$): CH$_2$ or —CH$_2$C≡CH.

27. A method as set forth in claim 26 wherein R is —CH$_2$CH:CH$_2$.

28. A method as set forth in claim 2 wherein the inhibitor comprises vinyltriphenylphosphonium bromide.

29. A method as set forth in claim 28 wherein the inhibitor further comprises 4-vinylpyridine.

30. A method as set forth in claim 1 in which the surfactant and corrosion inhibitor are incorporated simultaneously into the fluid.

31. A method as set forth in claim 2 in which the surfactant is incorporated into the fluid before the corrosion inhibitor.

* * * * *

UNITED STATES PATENT AND TRADEMARK OFFICE
CERTIFICATE OF CORRECTION

PATENT NO. : 5,456,767
DATED : October 10, 1995
INVENTOR(S) : Shah et al.

It is certified that error appears in the above-indentified patent and that said Letters Patent is hereby corrected as shown below:

```
    Column 22, line 1,
      claim 13, delete the number "11" and substitute
therefor -- 12 --.
```

Signed and Sealed this

Twelfth Day of March, 1996

Attest:

BRUCE LEHMAN

Attesting Officer     Commissioner of Patents and Trademarks